US009024950B2

(12) United States Patent
Joshi et al.

(10) Patent No.: US 9,024,950 B2
(45) Date of Patent: May 5, 2015

(54) METHOD AND SYSTEM FOR MONITORING OPERATION OF A SYSTEM ASSET

(75) Inventors: Mandar Sadashiv Joshi, Raigad (IN); Ajith Krishnan Menon, Mumbai (IN)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 13/589,726

(22) Filed: Aug. 20, 2012

(65) Prior Publication Data
US 2014/0049543 A1 Feb. 20, 2014

(51) Int. Cl.
*G06T 15/00* (2011.01)
*G05B 23/02* (2006.01)

(52) U.S. Cl.
CPC .................................. *G05B 23/0272* (2013.01)

(58) Field of Classification Search
CPC ........... A63B 2220/30; A63B 24/0003; A63B 2059/0003; A63B 2071/0636; A63B 2230/00; A63B 24/0062; A63B 71/0619; G01R 23/16; G01R 33/0206; G01R 33/10; H04B 17/0065; H04W 16/22; H04W 24/00; F16H 59/36; F02D 2041/1422; F02D 2041/2065; F02D 2200/0404; F02D 2200/0406; F02D 2200/0414; F02D 2200/0606; F02D 2200/0611; F02D 2200/0614; F02D 41/107; F02D 41/187; F02D 2250/04; F02D 31/005; F02D 41/403; G05B 2219/23182; G06T 7/0004; G01H 1/00

USPC .......................................................... 345/427
See application file for complete search history.

(56) References Cited

U.S. PATENT DOCUMENTS

| | | | |
|---|---|---|---|
| 6,041,287 A * | 3/2000 | Dister et al. ................... | 702/182 |
| 7,756,678 B2 | 7/2010 | Bonissone et al. | |
| 7,986,319 B2 | 7/2011 | Dommisse et al. | |
| 8,050,521 B2 | 11/2011 | Judelson | |
| 8,144,005 B2 | 3/2012 | Hu et al. | |
| 2004/0162685 A1* | 8/2004 | Gross et al. ...................... | 702/75 |
| 2008/0079723 A1* | 4/2008 | Hanson et al. ................. | 345/427 |
| 2009/0040227 A1* | 2/2009 | Vrba .............................. | 345/440 |
| 2009/0147005 A1* | 6/2009 | Kincaid ......................... | 345/440 |

* cited by examiner

*Primary Examiner* — Kee M Tung
*Assistant Examiner* — Haixia Du
(74) *Attorney, Agent, or Firm* — Fletcher Yoder, P.C.

(57) ABSTRACT

A device for use in monitoring operation of a system includes a display device and a processor coupled to the display device. The processor is configured to display, on the display device, a three-dimensional plot of a first operational characteristic of a system asset as a function of a second operational characteristic and as a function of a third operational characteristic of the system asset. The processor is also configured to receive a selection of the second operational characteristic, transform the three-dimensional plot into a two-dimensional plot of the first operational characteristic as a function of the third operational characteristic at the selected second characteristic, and display the two-dimensional plot on the display device.

20 Claims, 5 Drawing Sheets

METHOD AND SYSTEM FOR MONITORING OPERATION OF A SYSTEM ASSET

BACKGROUND OF THE INVENTION

The present application relates generally to monitoring systems and, more particularly, to a method and system for use in monitoring operations of a system asset.

At least some known power systems operate with a plurality of components, such as generators, motors, fans, and/or other components. Such components are often positioned within a building, such as a power plant or a factory. Over time, components may fail and/or may require maintenance. Often, system components are monitored to ensure that the components operate satisfactorily and/or to determine whether maintenance is required.

To facilitate monitoring system components, at least some known systems include a plurality of sensors coupled against, or proximate to, the components. Such sensors measure operating conditions of the components and transmit signals representative of the measured operating conditions to one or more monitoring systems. The monitoring systems may graphically display the measured operating conditions of the components in one or more displays. However, at least some displays are not able to simultaneously display measured operating conditions of a plurality of components and/or measured operating conditions of a single component taken at a plurality of times, in a user-friendly manner.

BRIEF DESCRIPTION OF THE INVENTION

In one embodiment, a device for use in monitoring operation of a system is provided that includes a display device and a processor coupled to the display device. The processor is configured to display, on the display device, a three-dimensional plot of a first operational characteristic of a system asset as a function of a second operational characteristic and as a function of a third operational characteristic of the system asset. The processor is also configured to receive a selection of the second operational characteristic, transform the three-dimensional plot into a two-dimensional plot of the first operational characteristic as a function of the third operational characteristic at the selected second characteristic, and display the two-dimensional plot on the display device.

In another embodiment, a method of displaying data is provided that includes receiving data representative of a first operational characteristic of a system asset, of a second operational characteristic of the system asset, and of a third operational characteristic of the system asset and displaying, on a display device, a three-dimensional plot of the first operational characteristic as a function of the second operational characteristic and of the third operational characteristic. The method also includes receiving a selection of the second operational characteristic, transforming the three-dimensional plot into a two-dimensional plot of the first operational characteristic as a function of the third operational characteristic at the selected second characteristic, and displaying the two-dimensional plot on the display device.

DETAILED DESCRIPTION OF THE INVENTION

Figure 1:
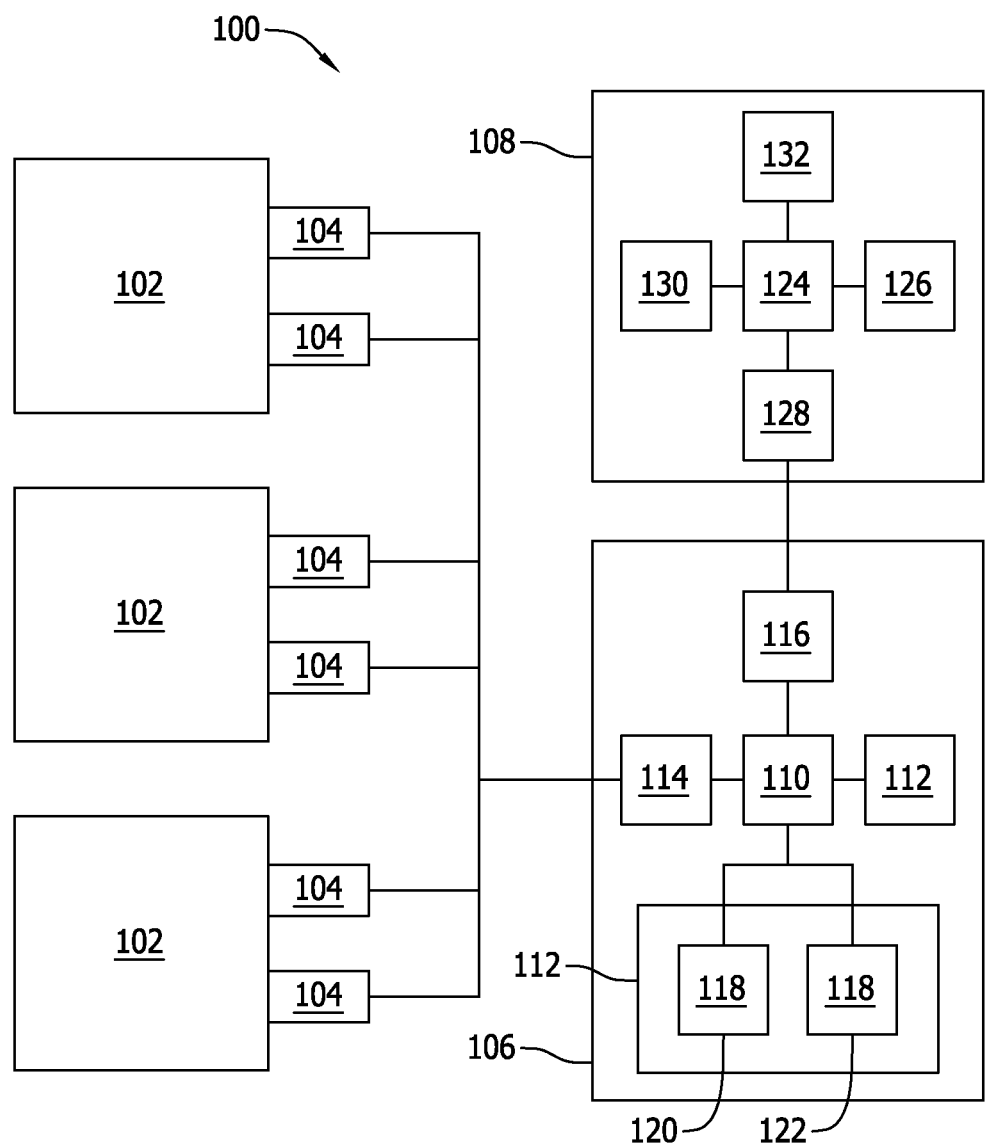
FIG. 1 is a block diagram of an exemplary monitoring system including a plurality of system assets.

FIG. 1 is a block diagram of an exemplary monitoring system 100 that includes a plurality of system assets 102. In the exemplary embodiment, system 100 may be, or may include, a factory, an industrial system or facility, a mill, a refinery, a manufacturing facility, a power generation plant or facility, and/or any other system that includes a plurality of system assets 102. System assets 102 may include, but are not limited to only including, machines, motors, generators, pumps, fans, computer systems or devices, sensors, and/or any other device or machine that enables system 100 to function as described herein.

In the exemplary embodiment, at least one sensor 104 is coupled to at least one system asset 102 for use in measuring an operating condition of asset 102. For example, if asset 102 is a rotating machine, sensors 104 may measure vibrations generated by a drive shaft of the machine, a rotational frequency or speed of the drive shaft, a temperature of the machine, a pressure within the machine, and/or any other operating condition of any component or device within or coupled to system 100.

System 100 also includes a data acquisition device 106 and a computing device 108 that is coupled to data acquisition device 106. In the exemplary embodiment, data acquisition device 106 includes a processor 110 coupled to one or more memory devices 112, a sensor interface 114 (also sometimes referred to as an input), a communication interface 116, and one or more databases 118.

Processor 110 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 112 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 112 includes data and/or instructions that are executable by processor 110 (i.e., processor 110 is programmed by the instructions) to enable processor 110 to perform the functions described herein.

Sensor interface 114 is coupled to sensors 104 for receiving signals representative of measured operating conditions of assets 102. More specifically, sensor interface 114 receives signals from sensors 104 via a wireless connection and/or via a wired connection to sensors 104. In the exemplary embodiment, sensor interface 114 converts and/or adjusts the signals received from sensors 104 for use with processor 110. In one embodiment, sensor interface 114 includes an analog-to-digital converter (ADC) that converts analog signals received from sensors 104 to digital data representative of the measured operating conditions (hereinafter referred to as "asset measurement data"), and the asset measurement data is transmitted to processor 110. In the exemplary embodiment, data acquisition device 106 determines a status of each system asset 102 based on the asset measurement data received.

Communication interface 116 may include, without limitation, a network interface controller (NIC), a network adapter, a transceiver, or any other communication interface or device that enables data acquisition device 106 to operate as described herein. In the exemplary embodiment, communication interface 116 may connect to computing device 108 using any suitable wired or wireless network and/or communication protocol.

Databases 118 include a measurement database 120 and a reference database 122. Alternatively, databases 118 may include any other database, and/or measurement database 120 and reference database 122 may be combined into one database 118. In one embodiment, databases 118 are included within one or more memory devices 112. Alternatively, databases 118 are included within one or more remote storage devices, such as a network attached storage (NAS) device, an external hard drive, a remote computing device, and/or any other storage device that enables data acquisition device 106 to function as described herein.

In the exemplary embodiment, processor 110 stores asset measurement data received from sensors 104 in database 120. During operation, sensor interface 114 receives sensor measurement signals from sensors 104 and converts the signals into asset measurement data that is stored, by processor 110, in measurement database 120. Moreover, processor 110, or another device, stores reference data for each system asset 102 in reference database 122. Reference data for each system asset 102 may include any suitable reference data concerning the system asset 102. For example, reference data may be based on the expected or predicted performance of a system asset 102 based, for example, on a manufacturer's specifications for the particular system asset 102. Additionally, or alternatively, reference data may be based on measurement data. In some embodiments, the reference data is derived from measurement data for a system asset 102 measured when the particular system asset 102 was newly installed in system 100 and/or functioning at its best. In some embodiments, a user may elect to store any desired measurement data for a system asset 102 as reference data for that system asset 102. In one embodiment, the reference data may include, or may be used to generate, one or more alarm and/or warning thresholds (described more fully herein) for system asset 102.

In the exemplary embodiment, computing device 108 is coupled to data acquisition device 106 for receiving data from data acquisition device 106 and/or displaying one or more graphical plots of measurement data from a system asset 102. Computing device 108 includes a processor 124 coupled to a memory device 126, a communication interface 128, a user input device 130, and a display device 132. In the exemplary embodiment, computing device 108 is a mobile device, such as a laptop, a smartphone, a personal digital assistant (PDA), a tablet computer, and/or any other device that functions as described herein. Alternatively, computing device 108 is a desktop computer, a server computer, and/or any other computing device that enables system 100 to function as described herein. In some embodiments, computing device 108 and data acquisition device 106 may be combined in a single device.

Processor 124 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 126 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 126 includes data and/or instructions that are executable by processor 124 (i.e., processor 124 is programmed by the instructions) to enable processor 124 to perform the functions described herein.

Communication interface 128 may include, without limitation, a network interface controller (NIC), a network adapter, a transceiver, or any other communication interface or device that enables computing device 108 to operate as described herein. In the exemplary embodiment, communication interface 128 may connect to data acquisition device 106 using any suitable wired or wireless network and/or communication protocol.

User input device 130 includes, without limitation, a keyboard, a keypad, a touch-sensitive screen, a mouse, a scroll wheel, a pointing device, an audio input device employing speech-recognition software, and/or any suitable device that enables a user to input data into computing device 108 and/or retrieve data from computing device 108. Display device 132 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying graphical data and text to a user. In one embodiment, display device 132 may be a touch-sensitive screen that incorporates aspects of user input device 130, for example, by enabling a user to input data and/or commands through the screen.

In the exemplary embodiment, processor 124 selectively displays, or causes to be displayed on display device 132, one or more measurement spectrum or waveforms for a system asset 102 derived from measurement data for system asset 102 in response to a user selection, for example. While processor 124 may display either measurement spectrums or waveforms, the embodiments are described herein with reference to measurement spectrums for the sake of clarity. The measurement spectrums are generally graphical spectrums of a first operational characteristic of system asset 102 as a function of a second operational characteristic of system asset 102 and a third operational characteristic of system asset 102. For example, the first operational characteristic may include a vibration of a component of system asset 102, such as a drive shaft of a motor or a generator. The second operational characteristic may include a frequency or speed of operation or rotation of system asset 102 or a component thereof, such as the drive shaft. The third operational characteristic may include a plurality of time periods (also referred to as "sample periods") in which measurements of system asset 102 are recorded.

Alternatively, any suitable operational characteristics of system asset 102 may be selected for the first operational characteristic, the second operational characteristic, and/or the third operational characteristic. For example, some exemplary first operational characteristics, second operational characteristics, and/or third operational characteristics may include, without limitation, a pressure, a temperature, a vibration, a speed, an acceleration, a frequency, length of time of operation, and/or any other characteristic of system asset 102 or a component of system asset 102.

Each measurement spectrum corresponds to an instant or an elapsed period of time at which the measurement data, from which the spectrum is derived, was collected. The length of the period of time may vary among various embodiments and/or according to the particular system asset 102. For example, data may be collected for a particular system asset 102 over a twenty-four hour period once a week, while data for another system asset 102 is collected for an entire week once a month. Each collection of data in a time period is sometimes referred to herein as a sample of reference data. Additionally, in some embodiments a sample of reference data may be subdivided into smaller time period samples. Thus, data for a system asset 102 may be collected substantially continuously and subdivided into hourly, daily, weekly, and/or monthly samples as desired.

As will be described in more detail below, in the exemplary embodiment, processor 124 simultaneously displays a plurality of measurement spectrums on display device 132. Thus, when a user selects to display a spectrum of a particular sample period for a system asset 102, processor may also display one or more additional measurement spectrums. In the exemplary embodiment, the additional measurement spectrums include one or more measurement spectrums of the immediately preceding, and the immediately following, sample periods. Alternatively, the user may select a plurality of measurement spectrums for a plurality of different sample periods for system asset 102.

Figure 2:
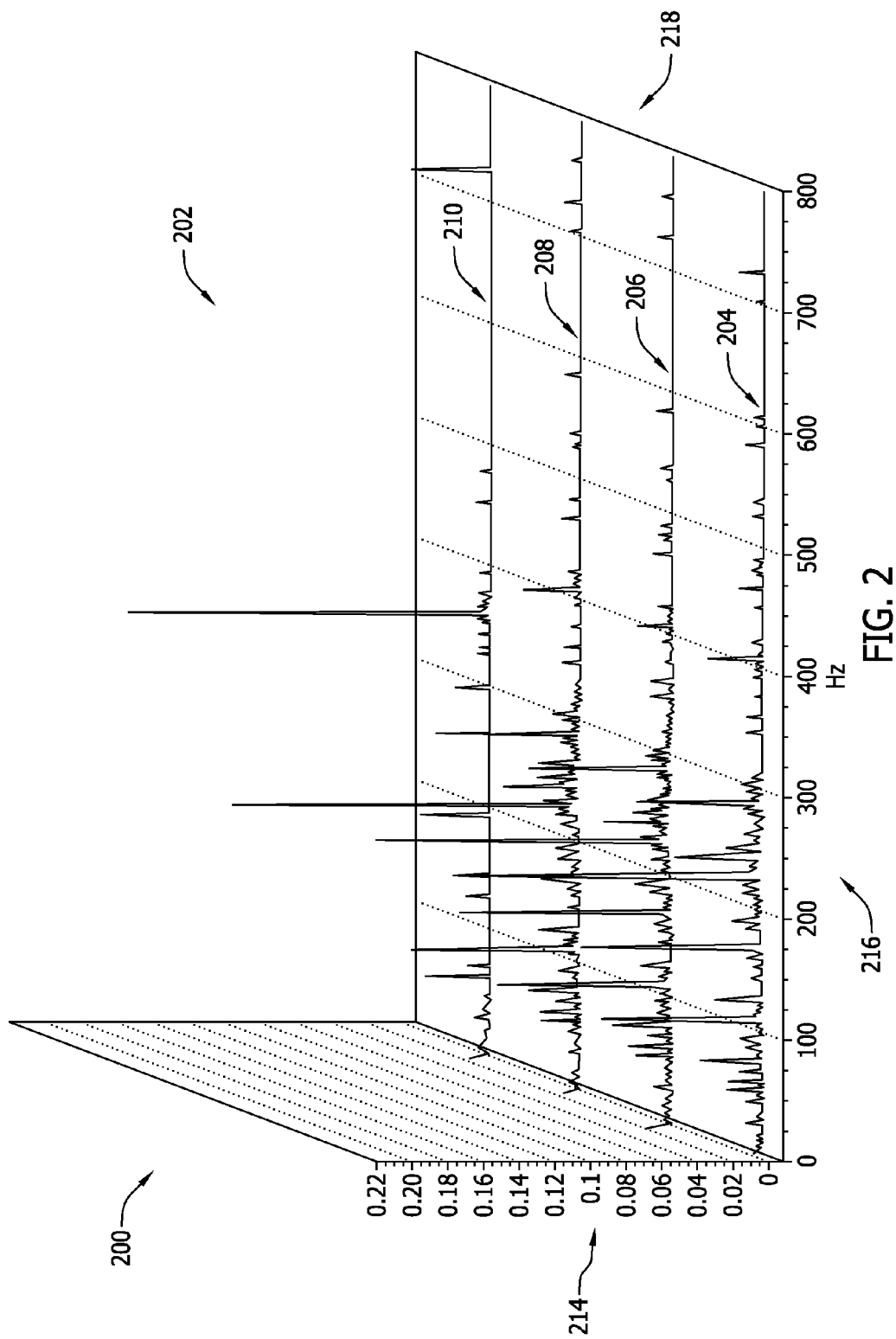
FIG. 2 is a graphical view of an exemplary display that may be produced by the system shown in FIG. 1.

FIG. 2 is a graphical view of an exemplary display 200 that may be produced by system 100 (shown in FIG. 1). In the exemplary embodiment, display 200 includes a three-dimensional (3D) plot 202 that includes a first measurement spectrum 204 derived from measurement data for a first time period, a second measurement spectrum 206 derived from measurement data for a second time period, a third measurement spectrum 208 derived from measurement data for a third time period, and a fourth measurement spectrum 210 derived from measurement data for a fourth time period. Although four measurement spectrums 204, 206, 208, and 210 are illustrated within display 200, it should be recognized that display 200 may include more or fewer measurement spectrums.

A first axis 214 of display 200 represents a magnitude or value of the first operational characteristic for the selected system asset 102, and a second axis 216 represents a magnitude or value of the second operational characteristic for the selected system asset 102. A third axis 218 of display 200 represents a magnitude or value of the third operational characteristic for the selected system asset 102 such that measurement spectrums 204, 206, 208, and 210 are separated from each other along third axis 218. For example, in an embodiment in which the third operational characteristic represents the sample periods for each spectrum 204, 206, 208, and 210, each point or value along third axis 218 represents a sample period for spectrum 204, 206, 208, or 210. Accordingly, each measurement spectrum 204, 206, 208, and 210 graphically illustrate the value of the first operational characteristic as a function of the second operational characteristic and the third operational characteristic.

Figure 3:
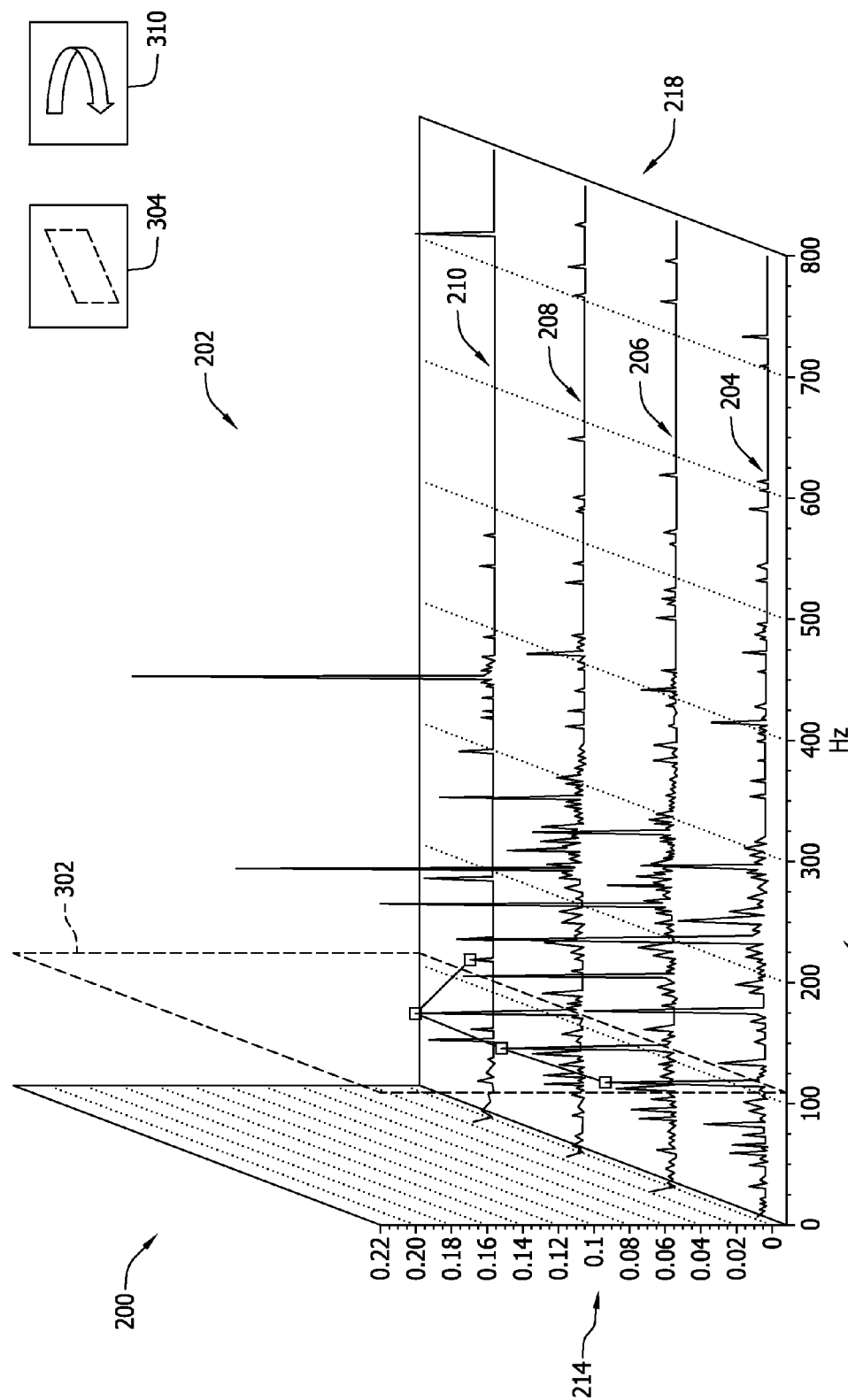
FIG. 3 is a graphical view of an exemplary display that includes a two-dimensional plane that may be produced by the system shown in FIG. 1.

FIG. 3 is a graphical view of an exemplary display 200 that includes a two-dimensional (2D) plane 302 displayed within, or superimposed upon, 3D plot 202. More specifically, in the exemplary embodiment, a user may manipulate user input device 130 to select a position along second axis 216 and to select a plane selector button or image 304 (hereinafter referred to as a "plane selector 304") displayed within display 200. In response to the selection of plane selector 304, processor 124 automatically displays 2D plane 302 at the location along second axis 216 selected by the user such that 2D plane 302 extends parallel to first axis 214 and third axis 218. Accordingly, 2D plane 302 intersects each spectrum 204, 206, 208, and 210 at a peak 306 of each spectrum. Processor 124 automatically identifies and connects peaks 306 of each spectrum 204, 206, 208, and 210 by forming or drawing a line 308 (also referred to as a "trend line 308") between adjacent peaks 306. In the exemplary embodiment, line 308 is contained within 2D plane 302 and does not extend outside of the boundaries of 2D plane 302. The user may select a plurality of locations or points along second axis 216 to "sweep" or scroll 2D plane 302 through 3D plot 202 to identify other peaks 306 and/or to display data of 3D plot 202 at the selected locations.

Moreover, the user may manipulate user input device 130 to select a transformation selector button or image 310 (hereinafter referred to as a "transformation selector 310") displayed within display 200. In response to the selection of transformation selector 310, a first transformation command is generated and processor 124 automatically transforms, or rotates, 3D plot 202 into a 2D plot (not shown in FIG. 3) that displays 2D plane 302. Accordingly, processor 124 transforms 3D plot 202 illustrating a plurality of second operational characteristic values into a 2D plot representative of the first operational characteristic as a function of the third operational characteristic at the selected second operational characteristic.

Figure 4:
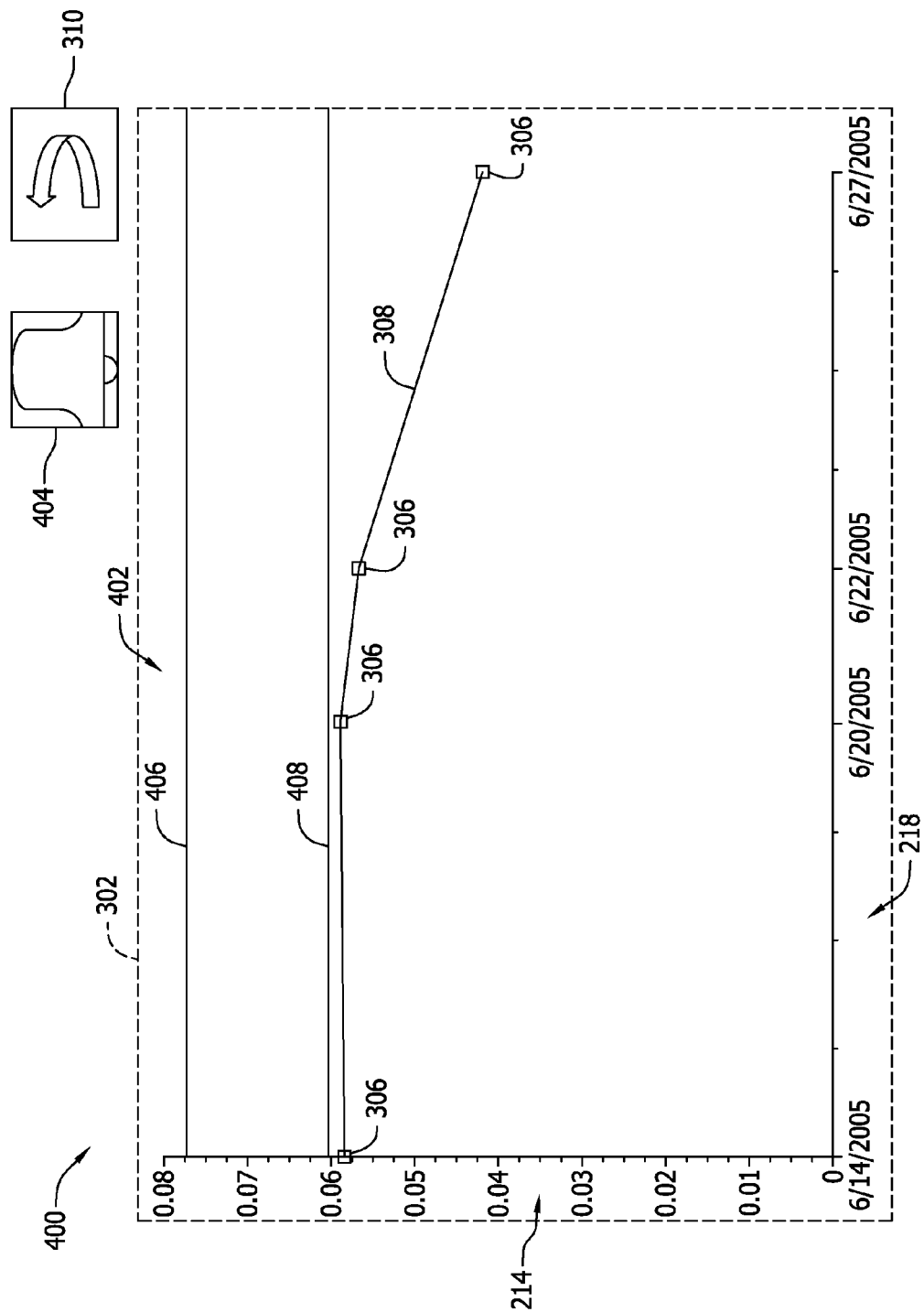
FIG. 4 is a graphical view of another exemplary display that may be produced by the system shown in FIG. 1.

FIG. 4 is a graphical view of an exemplary display 400 that may be produced by system 100 (shown in FIG. 1). Display 400 includes a 2D plot 402 of a portion of 3D plot 202 (shown in FIG. 3), such as 2D plane 302. More specifically, in the exemplary embodiment, 2D plot 402 illustrates the magnitude of the first operational characteristic (e.g., a vibration of system asset 102) as a function of the third operational characteristic (e.g., a plurality of time periods or sample periods) at a specified or selected second operational characteristic (e.g., a frequency of rotation or operation of system asset 102). Moreover, transformation selector 310 and an alarm selector 404 are displayed within 2D plot 402. Transformation selector 310 is selected by the user (e.g., using user input device 130) to generate a second transformation command that causes processor 124 to automatically transform, or rotate, 2D plot 402 into 3D plot 202 as illustrated in FIG. 3, for example.

When alarm selector 404 is selected by the user, for example, processor 124 causes one or more thresholds to be displayed on 2D plot 402. More specifically, in the exemplary embodiment, processor 124 causes an alarm threshold 406 and a warning threshold 408 to be displayed on 2D plot 402 when alarm selector 404 is selected. In the exemplary embodiment, alarm threshold 406 represents a first limit or a maximum allowable value of the first operational characteristic. If the first operational characteristic exceeds alarm threshold 406, processor 124 causes an alarm or another error notification to be generated. In the exemplary embodiment, warning threshold 408 represents a second limit value of the first operational characteristic that is lower than alarm threshold 406. If the first operational characteristic exceeds warning threshold 408, processor 124 causes a warning or another notification to be generated. In an alternative embodiment, any suitable number and/or type of threshold may be generated and/or displayed on 2D plot 402 to enable 2D plot 402 to function as described herein. It should be recognized that, in the exemplary embodiment, the user, or any other device or system, may select and/or set thresholds using user input device 130 or communication interface 128, for example.

Figure 5:
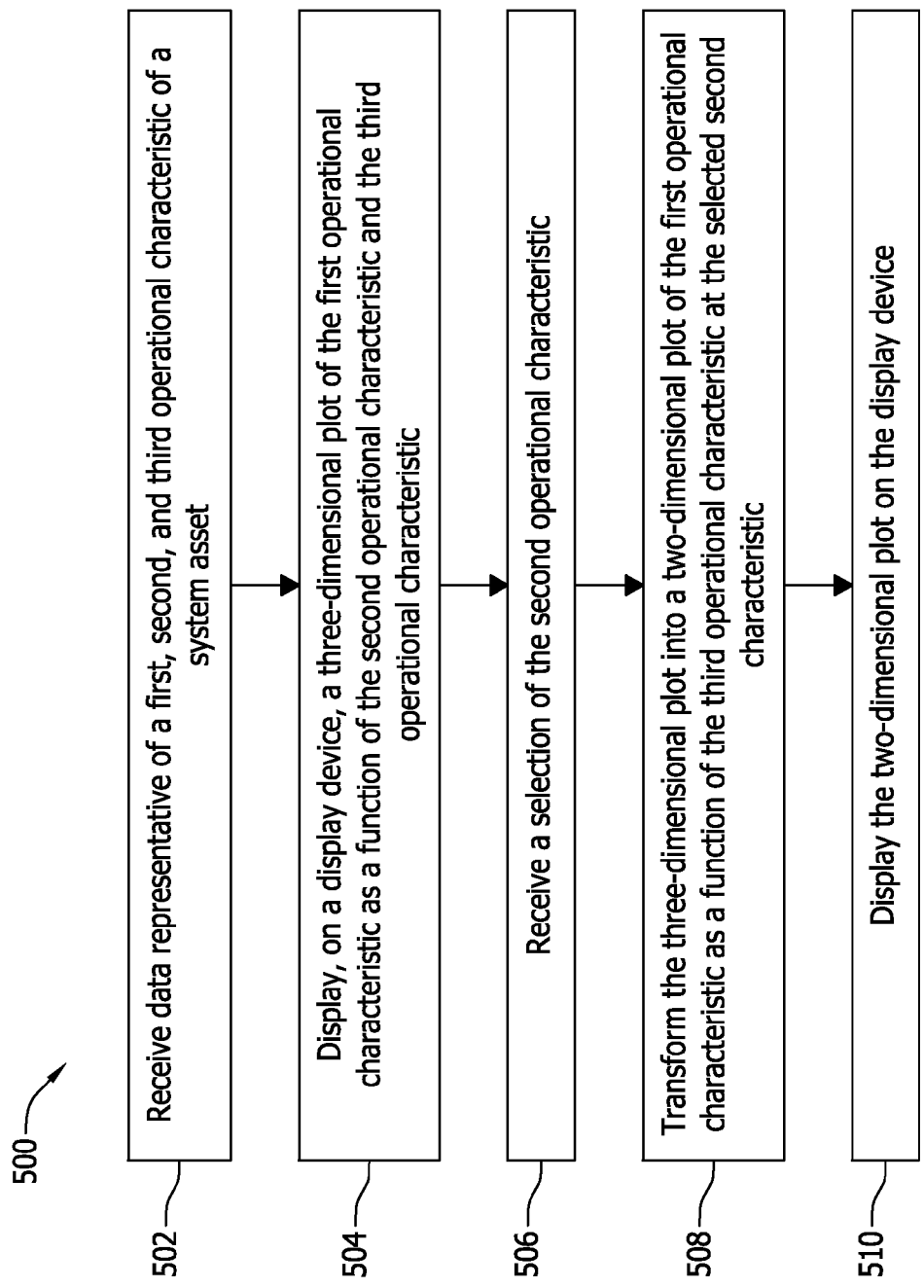
FIG. 5 is a flow diagram of an exemplary method of displaying data that may be executed by the system shown in FIG. 1.

FIG. 5 is a flow diagram of an exemplary method 500 of displaying data that may be used with system 100 (shown in FIG. 1). In the exemplary embodiment, method 500 is embodied within a plurality of computer-executable instructions stored within memory device 126. Moreover, in the exemplary embodiment, when processor 124 executes the instructions, the instructions program processor 124 to perform the steps of method 500.

In the exemplary embodiment, method 500 includes receiving 502 data representative of a first operational characteristic of system asset 102, a second operational characteristic of system asset 102, and a third operational characteristic of system asset 102. Method 500 also includes displaying 504, on display device 132, a three-dimensional plot, such as 3D plot 202 (shown in FIG. 2), of the first operational characteristic as a function of the second operational characteristic and the third operational characteristic. In the exemplary embodiment, the first operational characteristic includes data representative of a measured vibration of at least one component of system asset 102, the second operational characteristic includes data representative of a measured rotational frequency of at least one component of system asset 102, and the third operational characteristic includes data representative of a plurality of periods of time, or sample periods, in which the vibration and the rotational frequency were measured.

A selection of the second operational characteristic is received 506, for example, from a user input received through user input device 130 (shown in FIG. 1). Moreover, a 2D plane 302 is displayed within 3D plot 202 at the selected second operational characteristic. In the exemplary embodiment, 2D plane 302 is at least partially transparent such that at least a portion of 3D plot 202 behind 2D plane 302 is able to be viewed. Accordingly, 2D plane 302 enables one or more spectrums, such as spectrums 204, 206, 208, and/or 210, to be visible behind 2D plane 302 when 2D plane 302 is displayed within 3D plot 202.

In the exemplary embodiment, 3D plot 202 includes a plurality of spectrums, such as spectrums 204, 206, 208, and/or 210 (shown in FIG. 1), that display the first operational characteristic as a function of the second operational characteristic at different values of the third operational characteristic. When 2D plane 302 is displayed within 3D plot 202, a peak 306 of each spectrum is identified at a point where 2D plane 302 intersects each spectrum. Moreover, a line 308 connecting each of the identified peaks is displayed, and contained within, 2D plane 302.

3D plot 202 is transformed 508 into a two-dimensional plot, such as 2D plot 402 (shown in FIG. 4), of the first operational characteristic as a function of the third operational characteristic at the selected second characteristic. In the exemplary embodiment, 3D plot 202 is transformed 508 in response to receiving a first transformation command. The first transformation command is generated, for example, when a user selects transformation selector 310 (shown in FIG. 3).

2D plot 402 is displayed 510 on display device 132, and data represented within 2D plane 302 is displayed within 2D plot 402, such as the identified peaks of spectrums, values of the first operational characteristic at the identified peaks, and/or line 308 connecting the peaks. In the exemplary embodiment, 2D plot 402 is transformed back to 3D plot 202 in response to receiving a second transformation command. The second transformation command is generated, for example, when the user selects transformation selector 310 (shown in FIG. 4).

A technical effect of the systems and methods described herein includes at least one of (a) receiving data representative of a first operational characteristic of a system asset, of a second operational characteristic of the system asset, and of a third operational characteristic of the system asset; (b) displaying, on a display device, a three-dimensional plot of a first operational characteristic as a function of a second operational characteristic and of a third operational characteristic of a system asset; (c) receiving a selection of a second operational characteristic of a system asset; (d) transforming a three-dimensional plot into a two-dimensional plot of a first operational characteristic as a function of a third operational characteristic at a selected second characteristic of a system asset; and (e) displaying a two-dimensional plot on a display device.

The system described herein efficiently and robustly displays operational characteristics of system assets. The system displays a 3D plot of a first operational characteristic of the system asset as a function of a second operational characteristic and a third operational characteristic of the system asset in a plurality of spectrums. For example, the 3D plot may display an amplitude of vibration of the system asset as a function of a rotational frequency of the system asset at a plurality of sampling periods. A 2D plane is displayed in the 3D plot at a selected second operational characteristic. Peaks of the spectrums are identified at a point at which each spectrum intersects the 2D plane, and a line is displayed connecting each identified peak. The user may select a transformation selector within the display of the 3D plot to transform the 3D plot into a 2D plot that displays data represented within the 2D plane. The user may select the transformation selector to transform the 2D plot back to the 3D plot. Moreover, the user may move the 2D plane through the 3D plot to identify new peaks of the spectrums and/or to view data of the spectrums at different points. Accordingly, the system described herein facilitates review, troubleshooting, and analysis of system assets in an efficient and user-friendly manner as compared to at least some known monitoring systems.

Exemplary embodiments of a method and system for use in monitoring operation of one or more system assets are described above in detail. The method and system are not limited to the specific embodiments described herein, but rather, components of the system and/or steps of the method may be utilized independently and separately from other components and/or steps described herein. For example, the computing device may also be used in combination with other systems and methods, and is not limited to practice with only the system or the data acquisition device as described herein. Rather, the exemplary embodiment can be implemented and utilized in connection with many other power system or industrial applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for use in monitoring operation of a system, said device comprising:
   a display device; and
   a processor coupled to said display device, said processor configured to:
   display, on said display device, a three-dimensional plot of a first operational characteristic of a system asset as a function of a second operational characteristic and a third operational characteristic of the system asset;
   receive a selection of the second operational characteristic;
   display a two-dimensional plane within the three-dimensional plot at the selected second operational characteristic;
   identify a peak of each of a plurality of spectrums where the two-dimensional plane intersects each of the plurality of spectrums;
   display, on the display device, a line contained within the two-dimensional plane and connecting each of the identified peaks;
   transform the three-dimensional plot into a two-dimensional plot of the first operational characteristic as a function of the third operational characteristic at the selected second characteristic; and
   display the two-dimensional plot on said display device.

2. A device in accordance with claim 1, wherein said processor is configured to:
   display a measured vibration of the system asset as the first operational characteristic;
   display a measured rotational frequency of the system asset as the second operational characteristic; and
   display a plurality of periods of time in which the vibration and the rotational frequency were measured as the third operational characteristic.

3. A device in accordance with claim 1, wherein said processor is configured to display a plot of data represented within the two-dimensional plane as the two-dimensional plot.

4. A device in accordance with claim 1, wherein said processor is configured to display the two-dimensional plane at least partially transparently within the three-dimensional plot.

5. A device in accordance with claim 1, wherein the processor is configured to display, within each of the plurality of spectrums, the first operational characteristic as a function of the second operational characteristic at a different value of the third operational characteristic.

6. A device in accordance with claim 1, wherein said processor is further configured to:
   receive a first transformation command; and
   transform the three-dimensional plot to the two-dimensional plot in response to the first transformation command.

7. A device in accordance with claim 6, wherein said processor is further configured to:
   receive a second transformation command; and
   transform the two-dimensional plot to the three-dimensional plot in response to the second transformation command.

8. A method of displaying data, said method comprising:
   receiving data representative of a first operational characteristic of a system asset, of a second operational characteristic of the system asset, and of a third operational characteristic of the system asset;
   displaying, on a display device, a three-dimensional plot of the first operational characteristic as a function of the second operational characteristic and of the third operational characteristic;
   receiving a selection of the second operational characteristic;
   displaying a two-dimensional plane within the three-dimensional plot at the selected second operational characteristic;
   identifying a peak of each of a plurality of spectrums where the two-dimensional plane intersects each of the plurality of spectrums;
   displaying, on the display device, a line contained within the two-dimensional plane and connecting each of the identified peaks;
   transforming the three-dimensional plot into a two-dimensional plot of the first operational characteristic as a function of the third operational characteristic at the selected second characteristic; and
   displaying the two-dimensional plot on the display device.

9. A method in accordance with claim 8, wherein said receiving data representative of a first operational characteristic, a second operational characteristic, and a third operational characteristic comprises:
   receiving data representative of a measured vibration of the system asset as the first operational characteristic;
   receiving data representative of a measured rotational frequency of the system asset as the second operational characteristic; and
   receiving data representative of a plurality of periods of time in which the vibration and the rotational frequency were measured as the third operational characteristic.

10. A method in accordance with claim 8, further comprising displaying, within the two-dimensional plot, data represented within the two-dimensional plane.

11. A method in accordance with claim 8, further comprising displaying the two-dimensional plane to be at least partially transparent within the two-dimensional plot.

12. A method in accordance with claim 8, the method further comprising displaying, by the plurality of spectrums, the first operational characteristic as a function of the second operational characteristic at different values of the third operational characteristic.

13. A method in accordance with claim 8, further comprising:
   receiving a first transformation command; and
   transforming the three-dimensional plot to the two-dimensional plot in response to the first transformation command.

14. A method in accordance with claim 13, further comprising:
   receiving a second transformation command; and
   transforming the two-dimensional plot to the three-dimensional plot in response to the second transformation command.

15. A device for use in monitoring operation of a system, the device comprising:
   a processor configured to:
   generate, for display on a display device, a three-dimensional plot of a first operational characteristic of a system asset as a function of a second operational characteristic and a third operational characteristic of the system asset;
   receive a selection of the second operational characteristic;
   generate, for display on the display, a two-dimensional plane within the three-dimensional plot at the selected second operational characteristic;

identify a peak of each of a plurality of spectrums where the two-dimensional plane intersects each of the plurality of spectrums;

generate, for display on the display device, a line contained within the two-dimensional plane and connecting each of the identified peaks;

transform the three-dimensional plot into a two-dimensional plot of the first operational characteristic as a function of the third operational characteristic at the selected second characteristic; and generate, for display on the display device, the two-dimensional plot.

16. The device of claim 15, wherein the processor is configured to:

generate, for display on the display device, a measured vibration of the system asset as the first operational characteristic;

generate, for display on the display device, a measured rotational frequency of the system asset as the second operational characteristic; and generate, for display on the display device, a plurality of periods of time in which the vibration and the rotational frequency were measured as the third operational characteristic.

17. The device of claim 15, wherein, the processor is configured to generate, for display on the display device, a plot of data represented within the two-dimensional plane as the two-dimensional plot.

18. The device of claim 15, wherein the processor is configured to generate, for display on the display device, the two-dimensional plane at least partially transparently within the three-dimensional plot.

19. The device of claim 15, wherein the processor is configured to generate, for display on the display device, within each of the plurality of spectrums, the first operational characteristic as a function of the second operational characteristic at a different value of the third operational characteristic.

20. The device of claim 15, wherein the processor is further configured to:

receive a first transformation command; and transform the three-dimensional plot to the two-dimensional plot in response to the first transformation command.

\* \* \* \* \*